United States Patent [19]

Wang

[11] Patent Number: 4,993,157

[45] Date of Patent: Feb. 19, 1991

[54] FOOD CUTTING APPARATUS

[76] Inventor: John J. Wang, 1111 39th Ave. S.E., Puyallup, Wash. 98374

[21] Appl. No.: 519,808

[22] Filed: May 7, 1990

[51] Int. Cl.⁵ ............... B26B 3/00; B26B 9/00; B26B 7/02; A21C 5/08
[52] U.S. Cl. ................... 30/307; 30/114; 30/347; 83/466.1
[58] Field of Search ........... 30/307, 306, 347, 114; 83/431, 437, 466.1

[56] References Cited

U.S. PATENT DOCUMENTS

| | | | |
|---|---|---|---|
| 1,997,795 | 4/1935 | Inman | 30/307 |
| 3,094,026 | 6/1963 | Pottle | 39/307 |
| 4,411,066 | 10/1983 | Allahverdian | 30/114 |
| 4,625,607 | 12/1986 | Maillez | 83/466.1 |

Primary Examiner—Douglas D. Watts
Assistant Examiner—Paul M. Heyrana, Sr
Attorney, Agent, or Firm—Leon Gilden

[57] ABSTRACT

An apparatus for effecting precise slicing and division of various sheet-like food members, such as cake, pizza and the like. The apparatus includes a housing including a manually manipulatable drive gear positioned medially thereof, with the drive gear rotatable by use of a rotatable incrementally divided handle projecting orthogonally and upwardly relative to the housing, with a plurality of reciprocatable gear racks directed exteriorly of the housing through each opposed side thereof in cooperation with the gear to adjust spacing of cutting wheels, each mounted at a remote terminal end of each gear rack.

8 Claims, 7 Drawing Sheets

Fig 1

PRIOR ART

Fig 2

PRIOR ART

FOOD CUTTING APPARATUS

BACKGROUND OF THE INVENTION

1. Field of the Invention

The field of invention relates to cutting apparatus, and more particularly pertains to a new and improved food cutting apparatus wherein the same permits spacing of parallel cutting wheels to effect precise adjustment and division of foods utilizing the apparatus.

2. Description of the Prior Art

The proper division of various foods is desired to provide equal portions derived from the food minimizing wastage and disproportionate servings. Apparatus provided in the prior art to effect this arrangement may be found for example in U.S. Pat. No. 4,559,856 to Pettus utilizing spaced hoppers mounting reciprocatable plates to direct food components against spaced blades.

U.S. Pat. No. 4,411,066 to Allahverdian sets forth a cake cutter utilizing a polymorphic shaped cutting blade attached to a gear housing to effect adjustment of length and width of cut relative to an associated cake.

U.S. Pat. No. 2,716,950 to Johnston sets forth a pie marker positionable upon a pie to effect equal division of the cylindrical pie shape into equal portions.

U.S. Pat. No. 3,132,423 to Lano provides a food cutting apparatus utilizing a plate member to direct a cylindrical array of cutters through an underlying food sheet.

U.S. Pat. No. 4,625,607 to Maillez sets forth a food slicer utilizing a pivotal blade mounted to effect slicing and cutting of an associated food member mounted within a support saddle.

As such, it may be appreciated that there continues to be a need for a new and improved food cutting apparatus wherein the same provides advantages over the prior art in the proper division of generally planar food sheets and in this respect, the present invention substantially fulfills this need.

SUMMARY OF THE INVENTION

In view of the foregoing disadvantages inherent in the known types of food cutting apparatus now present in the prior art, the present invention provides a food cutting apparatus wherein the same is manually manipulatable about a planar-like sheet of food to effect equal division of the food into equal portions. As such, the general purpose of the present invention, which will be described subsequently in greater detail, is to provide a new and improved food cutting apparatus which has all the advantages of the prior art food cutting apparatus and none of the disadvantages.

To attain this, the present invention provides an apparatus for effecting precise slicing and division of various sheet-like food members, such as cake, pizza and the like. The apparatus includes a housing including a manually manipulatable drive gear positioned medially thereof, with the drive gear rotatable by use of a rotatable incrementally divided handle projecting orthogonally and upwardly relative to the housing, with a plurality of reciprocatable gear racks directed exteriorly of the housing through each opposed side thereof in cooperation with the gear to adjust spacing of cutting wheels, each mounted at a remote terminal end of each gear rack.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved food cutting apparatus which has all the advantages of the prior art food cutting apparatus and none of the disadvantages.

It is another object of the present invention to provide a new and improved food cutting apparatus which may be easily and efficiently manufactured and marketed.

It is a further object of the present invention to provide a new and improved food cutting apparatus which is of a durable and reliable construction.

An even further object of the present invention is to provide a new and improved food cutting apparatus which is susceptible of a low cost of manufacture with regard to both materials and labor, and which accordingly is then susceptible of low prices of sale to the consuming public, thereby making such food cutting apparatus economically available to the buying public.

Still yet another object of the present invention is to provide a new and improved food cutting apparatus which provides in the apparatuses and methods of the prior art some of the advantages thereof, while simultaneously overcoming some of the disadvantages normally associated therewith.

Still another object of the present invention is to provide a new and improved food cutting apparatus wherein the same permits spaced parallel rotary blades mounted to be drawn over a quantity of food to effect division and slicing of food into equal portions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 8 is an isometric cross-sectional view of the support gear rack, cutting wheel, and securement cap utilized by the instant invention.

DESCRIPTION OF THE PREFERRED EMBODIMENT

With reference now to the drawings, and in particular to FIGS. 1 to 13 thereof, a new and improved food cutting apparatus embodying the principles and concepts of the present invention and generally designated by the reference numeral 10 will be described.

Figures 1, 2:
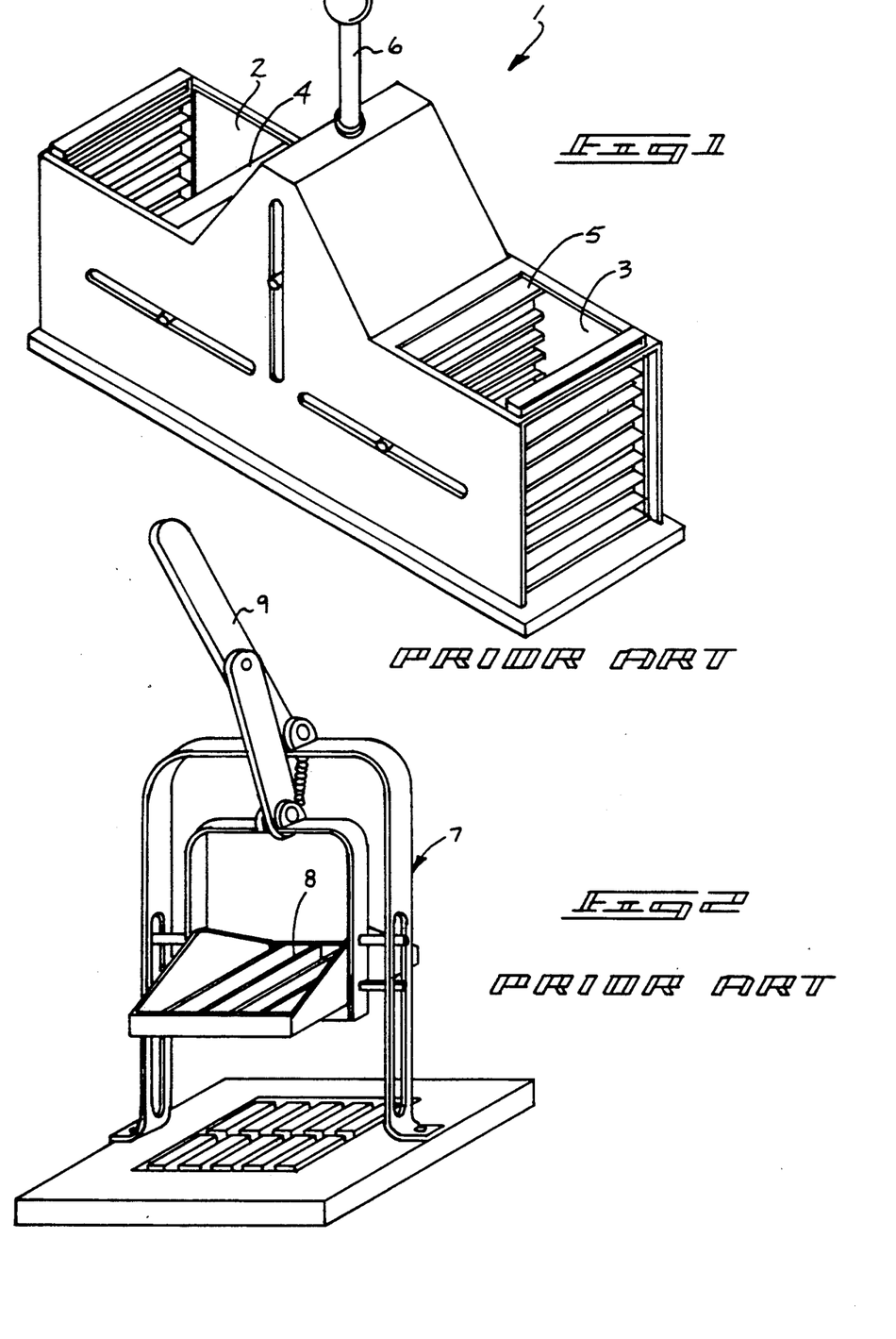
FIG. 1 is an isometric illustration of a prior art food cutting apparatus.
FIG. 2 is an isometric illustration of a further prior art food cutting apparatus.
Figure 2:
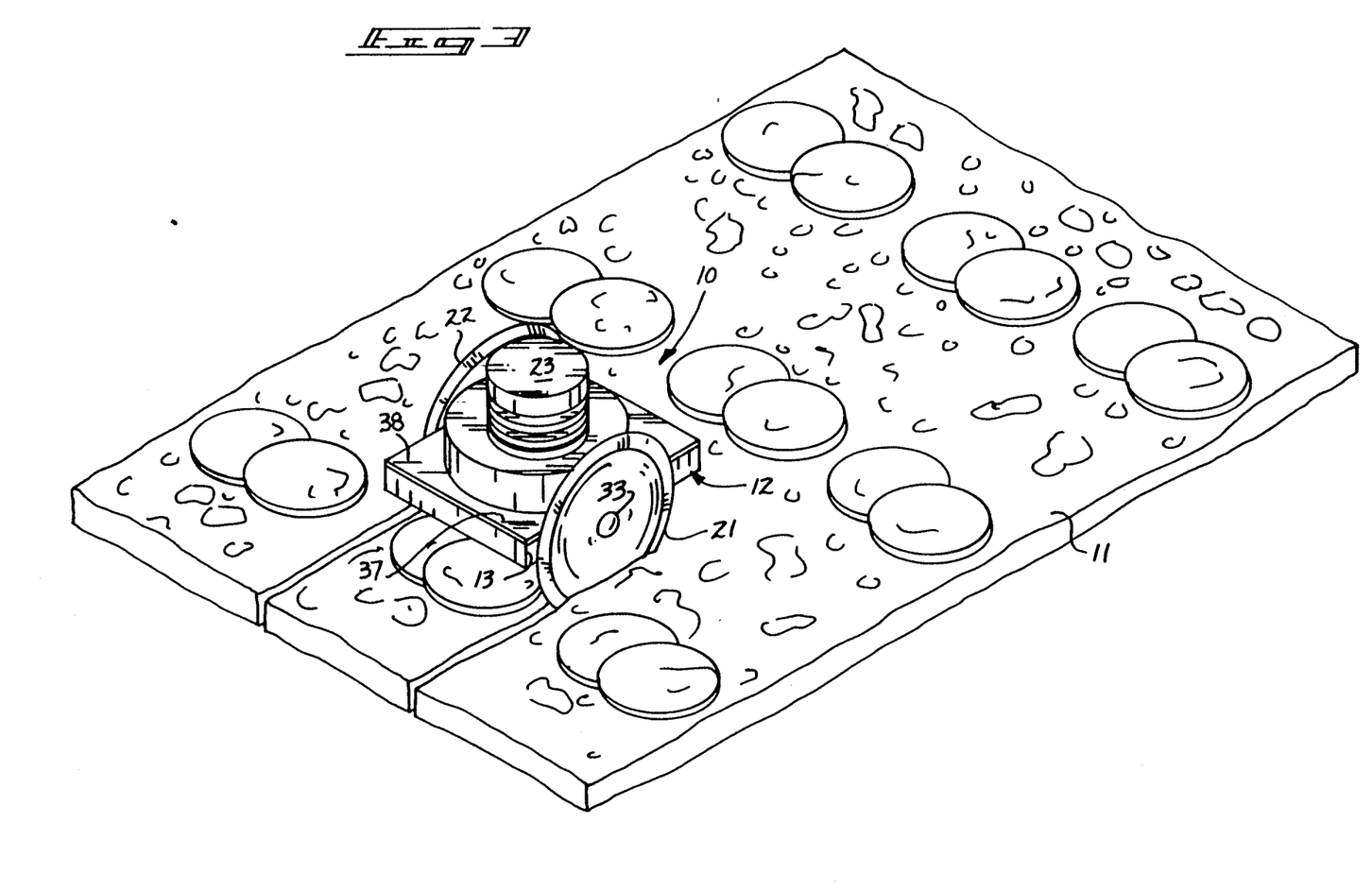

FIG. 1 illustrates a prior art food cutter 1, utilizing a spaced first and second bin 2 and 3 respectively, including a reciprocatable plate 4 and 5 to direct food quantities positioned within each bin against spaced blades, as illustrated. FIG. 2 illustrates a yoke member 7, including a handle 9 to reciprocate a plate 8 against an underlying cutting arrangement.

Figure 4:
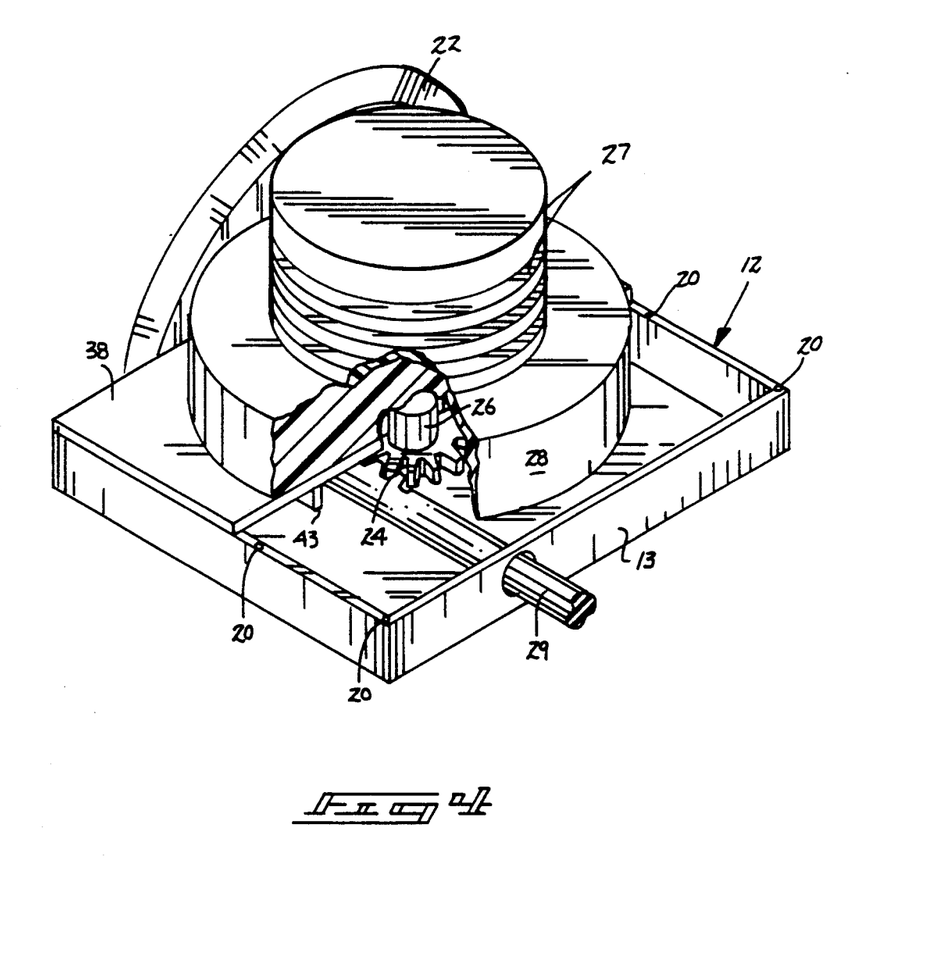
FIG. 4 is an isometric illustration of the instant invention partially in section.
Figures 5, 6, 7:
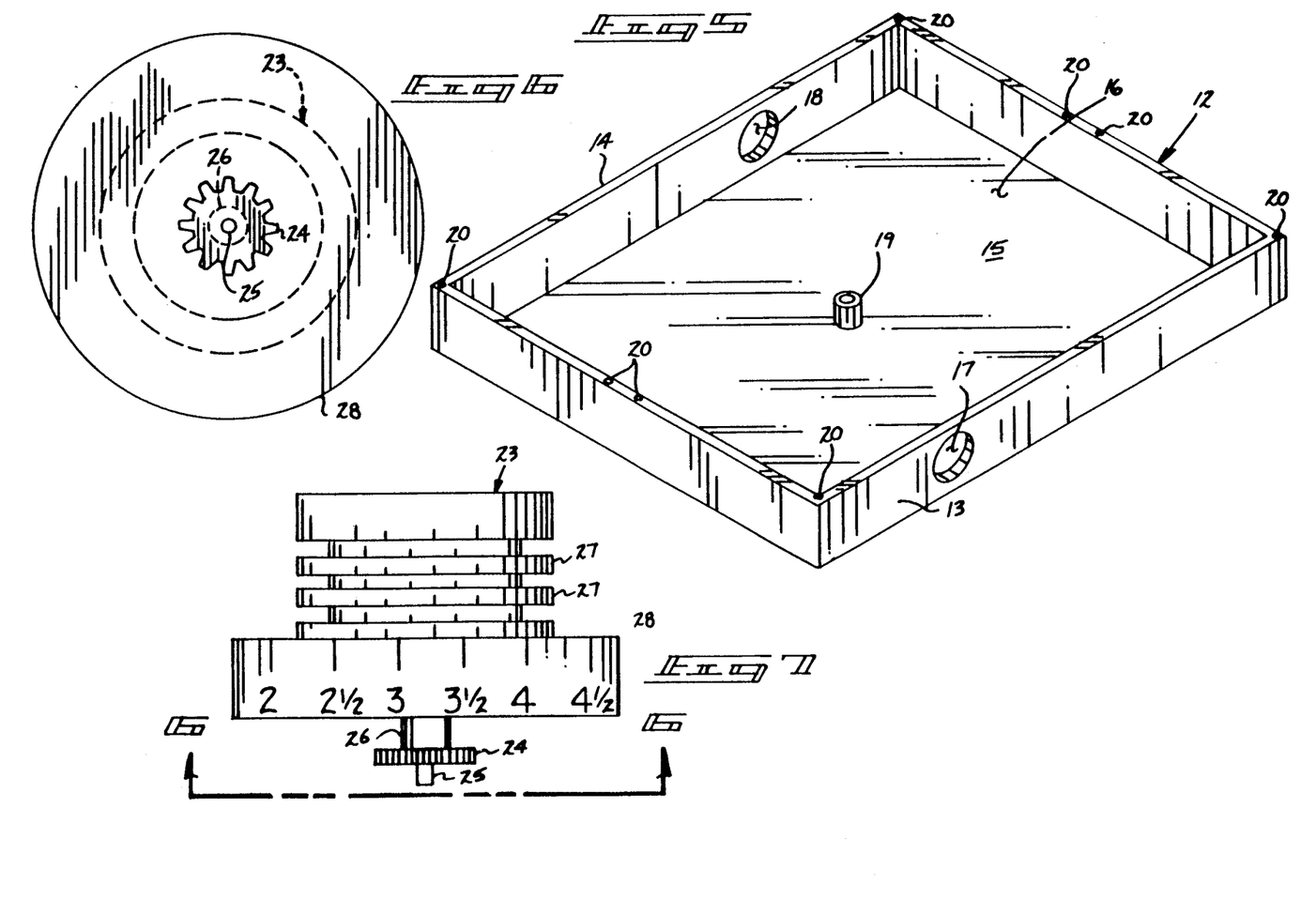
FIG. 5 is an isometric illustration of the housing container of the instant invention.
FIG. 6 is an orthographic view, taken along the lines 6—6 of FIG. 7, in the direction indicated by the arrows.
FIG. 7 is an orthographic side view, taken in elevation, of the adjustment head utilized by the instant invention.
Figures 8B, 9:
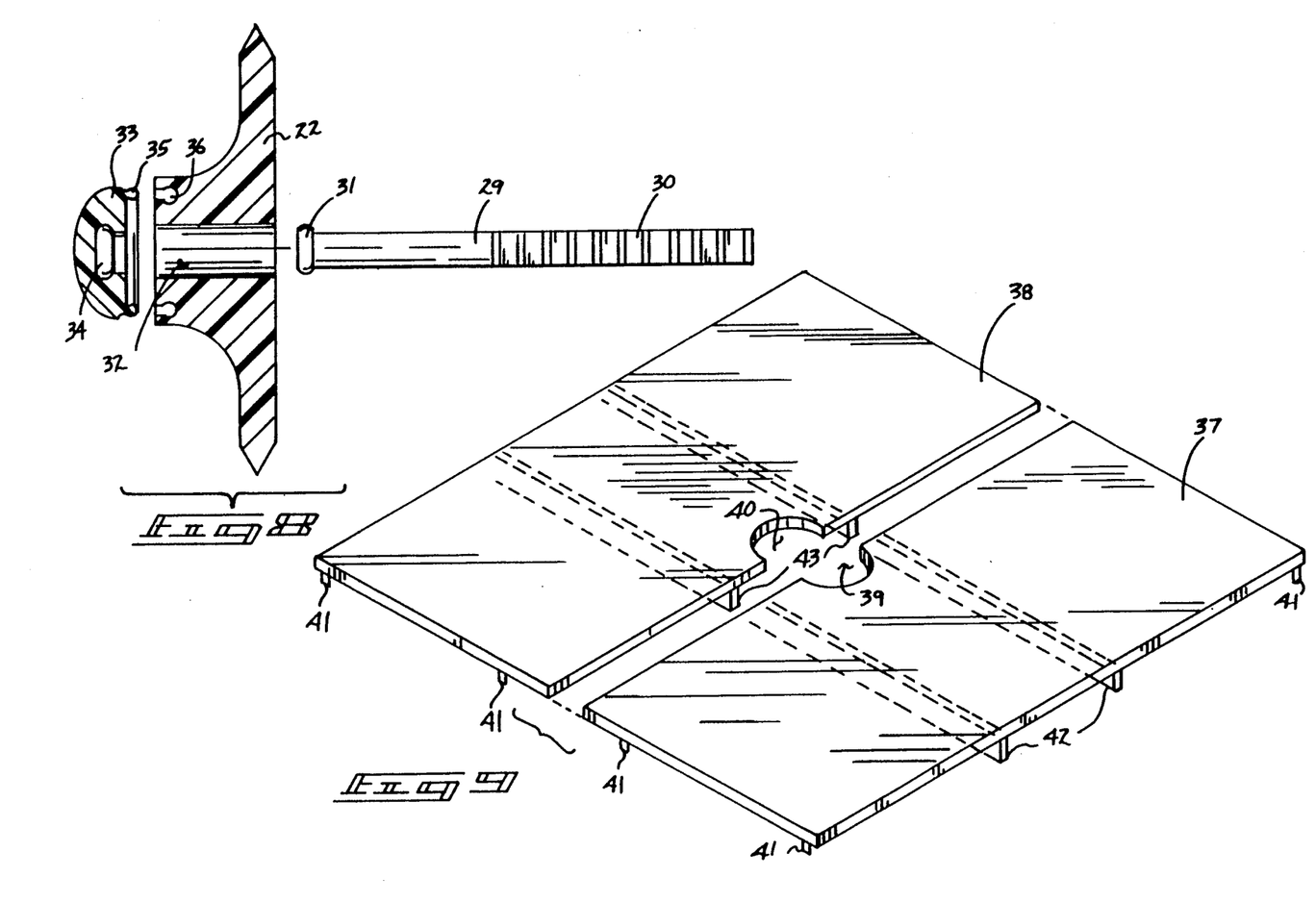
FIG. 9 is an isometric illustration of the lids utilized to secure the gear and adjustment mechanism within the housing container of the instant invention.
Figure 10:
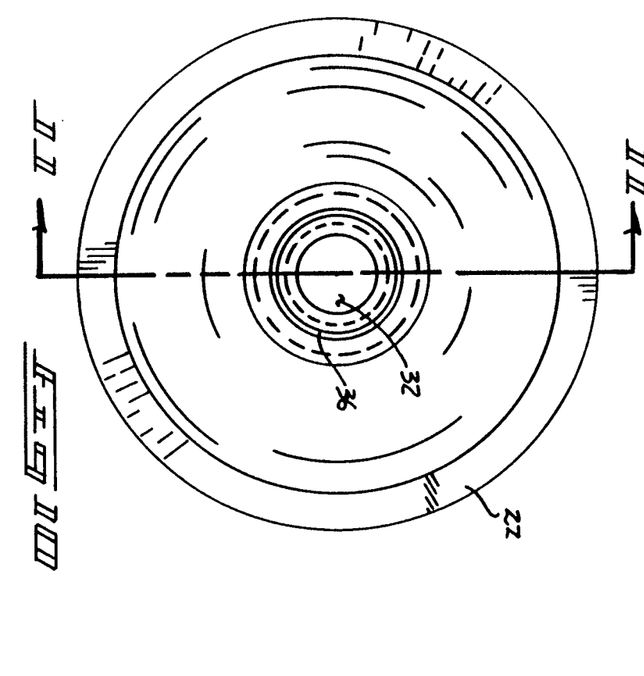
FIG. 10 is an orthographic side view, taken in elevation, of a typical cutting wheel utilized by the instant invention.
Figure 11:
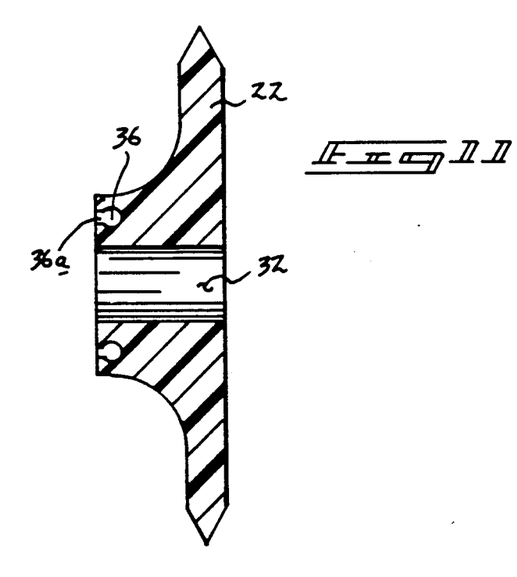
FIG. 11 is an orthographic side view, taken along the lines 11—11 of FIG. 10, in the direction indicated by the arrows.
Figure 12:
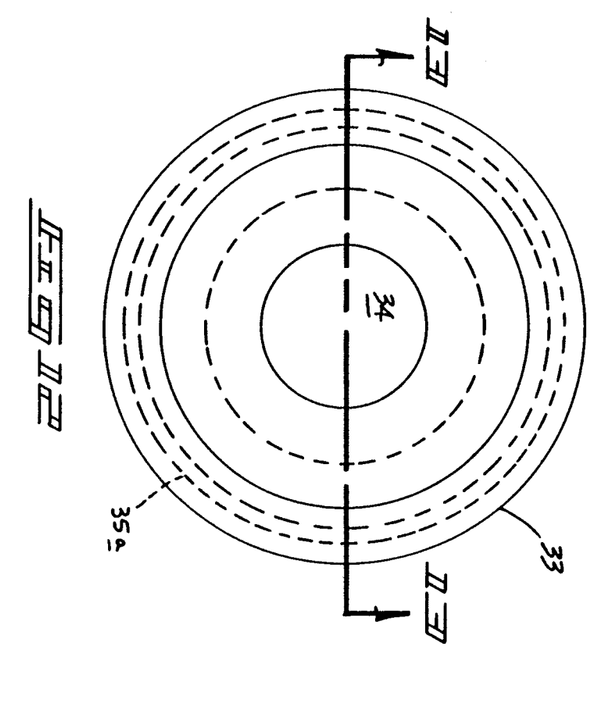
FIG. 12 is an orthographic interior view, taken in elevation, of the cap as utilized by the instant invention.
Figure 13:
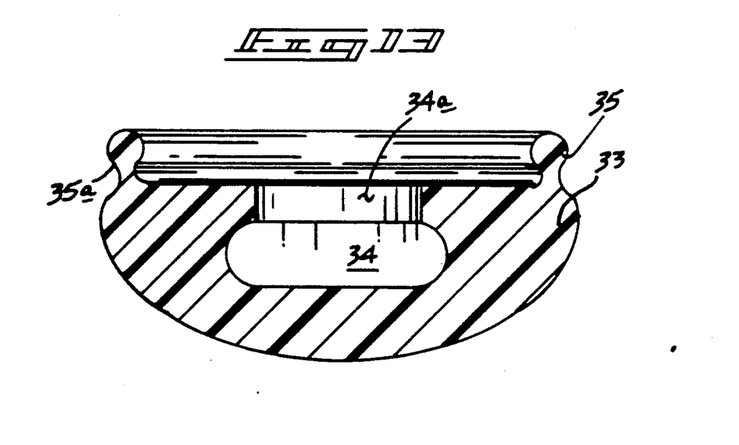
FIG. 13 is an orthographic view, taken along the lines 13—13 of FIG. 12, in the direction indicated by the arrows.

More specifically, the food cutting apparatus 10 of the instant invention is utilized (as illustrated in FIG. 3) to provide division of a planar food component 11, such as pizza or cake. The apparatus 10 essentially includes a central housing container 12 defined by spaced parallel walls defining a generally parallelepiped cavity 16. The container 12 includes a first wall 13 spaced from and parallel to a second wall 14 defining side walls of the container, with a coextensive planar floor 15. The first wall 13 includes a first opening 17 positioned adjacent a forward wall of the container, wherein a second opening 18 directed orthogonally through the second wall 14 is positioned adjacent a rear wall of the container, as illustrated in FIGS. 4 and 5 for example. A central gear support post 19 is integrally mounted orthogonally and medially of the floor 15 and includes a central blind support bore 19a. The support bore 19 complementarily and rotatably receives a gear post 25 therewithin that is coaxially and integrally mounted to a forward face of an associated gear member 24. The gear member 24 includes a bearing cylinder 26 defined by a first diameter. The bearing cylinder 26 is orthogonally mounted to a bottom surface of a graduated dial cylinder 28 defined by a diameter substantially greater than that of the bearing cylinder 26, and includes a series of spaced gradations thereabout. The dial cylinder 28 is a lower component of an adjustment head 23 mounted rotatably upon a top surface of the container 12 and slidably mounted upon respective first and second lids 37 and 38, as illustrated in FIGS. 3 and 9 for example. The gear member 24 rotatably mounted within the cavity 16 cooperates with a respective pair of support gear racks 29 extending interiorly of the cavity 16 and orthogonally relative to the respective first and second side walls 13 and 14. Each gear rack 29 and its construction, as illustrated typically in FIG. 8, includes a parallel set of gear teeth 30 that cooperate with the gear member 24 and engage at diametrically opposed surfaces of the gear 24 when received within the housing. Rotation of the adjustment head 23 in a clockwise manner effects retraction of the support gear racks 29 interiorly of the cavity 16, while counterclockwise rotation of the adjustment head 23 effects extension of the gear racks 29. The spacing is determined by alignment of the dial cylinder 28 with an associated indicator defined by the interior side edges of the lids 37 and 38. Rotatably mounted to each external end of the support gear racks 29 are respective first and second cutter wheels 21 and 22. Each cutter wheel 21 and 22 is defined by a predetermined second diameter defining a diameter greater than the height of the housing walls 13 and 14 for example. The cutters include an annular cutting blade edge defining a circular periphery relative to each of the cutter wheels to effect cutting of an underlying food component 11, as illustrated in FIG. 3. It should be noted further that the adjustment head 23 in use utilizes spaced parallel ribs 27 to enhance grasping of the cutter head in the extension and retraction of the cutter wheels relative to the housing container 12.

Each of the gear racks 29 are arranged parallel relative to one another within the housing container 12, and each gear rack 29 includes an enlarged head member 31 mounted on a respective gear rack at a free end thereof exteriorly of the respective side wall, wherein each head member 31 is contained within a securement cap 33. Reference to FIG. 8 illustrates the assemblage wherein the gear rack 29 is positioned rotatably through a wheel bore 32 coaxially directed through each respective wheel 21 and 22, wherein an exterior surface of each wheel 22 includes a cylindrical sleeve 36a directed into an enlarged doughnut shaped chamber 36. Each doughnut chamber 36 receives complementarily a cylindrical protuberance rim positioned exteriorly of an interior surface of each cap 33, including a cylindrical connecting web 35a, wherein the cylindrical web 35a is received within the sleeve 36a, while the protuberance rim 35 is complementarily received within the associated chamber 36 within the wheel 21 and 22. The cap 33 further includes a cylindrical head member cavity 34 to complementarily receive the head member 31 therewithin. The cap 33 is formed of a semi-rigid polymeric component of a memory retentent material to permit expansion of the entrance chamber 34a and receive the head member 31 therethrough to be directed within the associated head member cavity 34, while simultaneously each protuberance rim 35 is received within each complementarily configured enlarged chamber 36 to fixedly secure each wheel to an associated free terminal end of each gear rack 29.

The upper end surfaces of each of the forward and rear end walls of the container 12 include blind bores 20 to receive complementarily pegs 41 mounted adjacent forward and rear terminal ends of the lids 37 and 38. The lids 37 and 38 each includes a respective first and second semi-cylindrical recess 39 and 40 directed within each confronting interior edge of each respective lid. The first and second semi-cylindrical recesses 39 and 40, when secured together, define a diameter substantially equal to the first diameter to complementarily receive rotatably therewithin the bearing cylinder 26 to align the bearing cylinder relative to the underlying gear support post 19. First and second pairs of spaced parallel guards 42 and 43 are mounted equally distant relative to the respective semi-cylindrical recess of each lid to accordingly capture and position each of the gear racks 29 within the container 12. In this manner, geometric integrity of the organization is maintained during use and operation of the organization.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A food cutting apparatus comprising,
   a central housing container, the container including a first wall spaced from and parallel to a second wall, and
   a floor coextensively and orthogonally mounted to the first wall and second wall of the container, and
   a first aperture directed orthogonally through the first wall, and
   a second aperture orthogonally directed through the second wall, the first and second aperture offset relative to one another, and
   first wheel means mounted through the first aperture, and second wheel means mounted through the second aperture, wherein the first and second wheel means are positioned for simultaneous reciprocation relative to the housing container.

2. An apparatus as set forth in claim 1 wherein the first and second wheel means each include an elongate support gear rack including a series of parallel gear teeth mounted thereon, and the floor includes a central gear support post, the gear support post including a gear support post bore coaxially arranged orthogonally relative to the floor, and a gear rotatably mounted within the gear support post aperture, and the gear in simultaneously meshing engagement with each support gear rack of each first and second wheel means, wherein each support rack of each first and second gear means are in diametrically opposed relationship relative to the gear.

3. An apparatus as set forth in claim 2 wherein each support gear rack includes a cutter wheel rotatably mounted at each free terminal end of each support gear rack positioned exteriorly of the respective first and second walls.

4. An apparatus as set forth in claim 3 wherein each cutter wheel includes a coaxially through-extending cutter wheel bore, and each cutter wheel includes an interior surface and an exterior surface, with each interior surface in confronting relationship with a respective first and second wall of the container, and each exterior surface of each cutter wheel including a cylindrical cavity sleeve coaxially arranged about each exterior surface of each cutter wheel, wherein each cavity sleeve includes an enlarged chamber positioned in a spaced relationship relative to each exterior surface, and each support gear rack includes an enlarged head positioned exteriorly of each exterior surface of each cutter wheel, and each enlarged head receivable within a securement cap.

5. An apparatus as set forth in claim 4 wherein each cap includes a cap entrance chamber coaxially aligned with each cutter wheel, and each securement cap further includes a cylindrical connecting web, wherein the cylindrical connecting web includes a cylindrical rim, and wherein the cylindrical rim and the cylindrical connecting web are complementarily received within the cylindrical sleeve and enlarged chamber of each cutter wheel.

6. An apparatus as set forth in claim 5 wherein the gear includes a bearing cylinder mounted coaxially to a top surface of the gear, the bearing cylinder including a graduated dial cylinder, wherein the graduated dial cylinder is graduated in equally spaced intervals, and the dial cylinder includes a head member mounted coaxially to a top surface of the graduated dial cylinder, and the housing container further includes a first and second lid overlying the housing container with the gear received underlying the first and second lid, and the bearing cylinder rotatably mounted through each first and second lid, and the graduated dial cylinder rotatably mounted onto a respective first and second top surface of each respective first and second lid.

7. An apparatus as set forth in claim 6 wherein each lid includes a semi-annular cavity directed through each confronting edge of each first and second lid, wherein each first and second semi-cylindrical cavity defines a predetermined diameter, and the bearing cylinder is defined by a predetermined diameter complementarily received within the first and second semi-annular cavity when the first and second lids are mounted on the housing container.

8. An apparatus as set forth in claim 7 wherein each first and second lid includes a series of pegs orthogonally mounted to forward and rear portions of each respective first and second lid, and the housing container further including a forward and rear wall, the forward and rear wall each including a series of peg apertures, wherein the pegs are complementarily received within the peg apertures of the forward and rear walls to secure the first and second lid to the housing container.

* * * * *